(12) United States Patent
Dosaki et al.

(10) Patent No.: US 9,283,835 B2
(45) Date of Patent: Mar. 15, 2016

(54) DOOR INNER WEATHER STRIP

(71) Applicant: TOYODA GOSEI CO., LTD., Kiyosu-shi, Aichi-ken (JP)

(72) Inventors: Tomohiro Dosaki, Kiyosu (JP); Masatoshi Nojiri, Kiyosu (JP); Kisato Oba, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/612,716

(22) Filed: Feb. 3, 2015

(65) Prior Publication Data

US 2015/0266365 A1    Sep. 24, 2015

(30) Foreign Application Priority Data

Mar. 18, 2014  (JP) .................................. 2014-054479

(51) Int. Cl.
    *B60J 10/00*    (2006.01)
    *B62D 65/08*    (2006.01)

(52) U.S. Cl.
    CPC .......... *B60J 10/0091* (2013.01); *B60J 10/0014* (2013.01); *B60J 10/0088* (2013.01)

(58) Field of Classification Search
    CPC .............. B60J 10/0091; B60J 10/0088; B60J 10/0014; B60J 10/04
    USPC ........................................................ 49/377
    See application file for complete search history.

(56) References Cited

U.S. PATENT DOCUMENTS

| | | | | |
|---|---|---|---|---|
| 5,085,005 A | * | 2/1992 | Yasukawa et al. | 49/377 |
| 5,319,883 A | * | 6/1994 | Gueneau et al. | 49/489.1 |
| 5,388,371 A | * | 2/1995 | Nozaki | 49/377 |
| 5,651,578 A | * | 7/1997 | Mistopoulos et al. | 296/146.9 |
| 2005/0166459 A1 | * | 8/2005 | Watanabe et al. | 49/415 |
| 2006/0248802 A1 | * | 11/2006 | Tamaoki et al. | 49/441 |
| 2007/0251152 A1 | * | 11/2007 | Takase et al. | 49/441 |
| 2010/0011671 A1 | * | 1/2010 | Gentemann | 49/489.1 |
| 2013/0133266 A1 | * | 5/2013 | Matsuura et al. | 49/414 |

FOREIGN PATENT DOCUMENTS

| | | |
|---|---|---|
| JP | 2012-171559 A | 9/2012 |
| JP | 2013-107608 A | 6/2013 |

* cited by examiner

*Primary Examiner* — Katherine Mitchell
*Assistant Examiner* — Scott Denion
(74) *Attorney, Agent, or Firm* — Posz Law Group, PLC (57) ABSTRACT

A weather strip capable of preventing the reversing of seal lips caused by the raising and lowering of a door glass, and restraining the increment of the raising/lowering load of the door glass to enable the smooth raising and lowering of the door glass. The door inner weather strip includes a trim section and a seal section. The seal section includes a first seal section and a second seal section, and the first seal section and the second seal section are respectively provided with a first attaching leg and a second attaching leg along with a first seal lip and a second seal lip for contacting the door glass. The first seal lip and the second seal lip are formed such that tips thereof face each other, and the first seal lip is formed such that when the first seal lip and the second seal lip contact the door glass, the tip of the second seal lip is overlapped with the tip of the first seal lip so as to press the same.

18 Claims, 5 Drawing Sheets

DOOR INNER WEATHER STRIP

CROSS-REFERENCE TO RELATED APPLICATION

This application is related to and claims priority from Japanese patent Application No. 2014-054479 incorporated herein by reference.

BACKGROUND OF THE INVENTION

1. Field of the Invention

The present invention relates to a door inner weather strip for attachment to an automobile door provided with a door glass that is raised and lowered.

2. Description of Related Art

Figure 1:
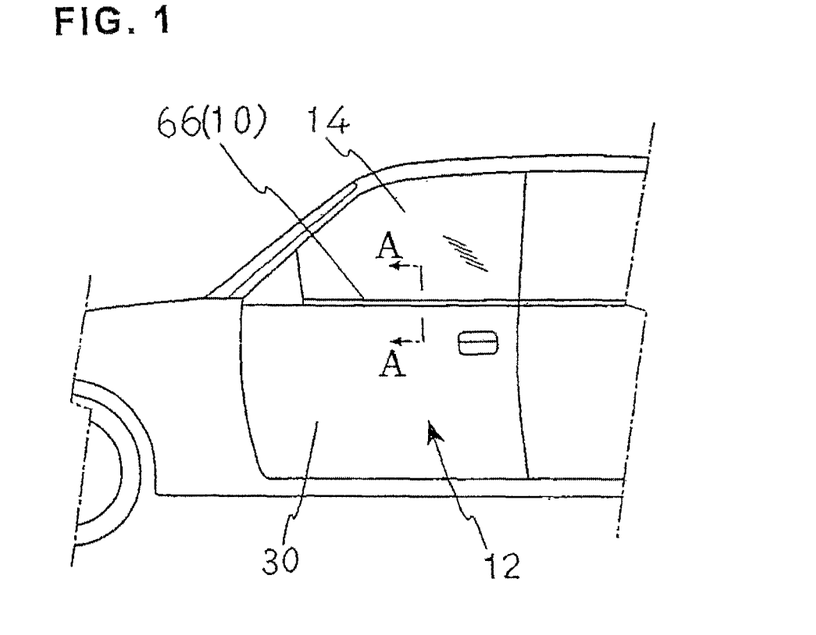
FIG. 1 is a side view of an automobile.
Figure 2:
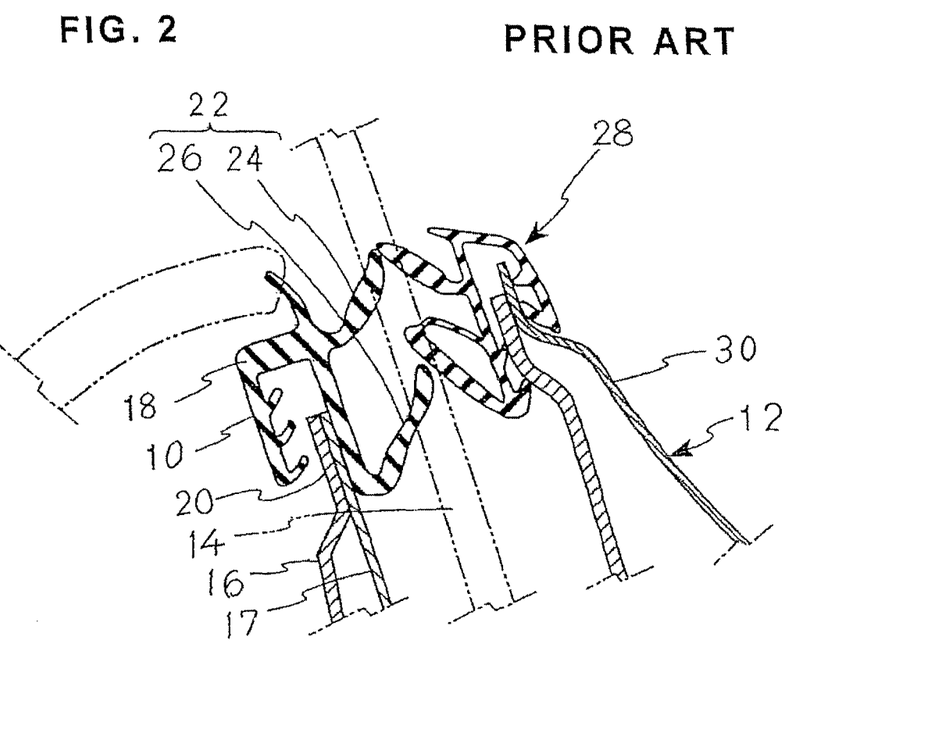
FIG. 2 is a cross-sectional view of a conventional door inner weather strip around a belt line of a door, taken along line A-A of FIG. 1.

As shown in FIG. 1 and FIG. 2, a door inner weather strip 10 is attached to an automobile door 12 around a belt line thereof, that is along a flange in an upper edge of a door panel, to cover a space between an interior side surface of a door glass 14 capable of being raised and lowered, and an upper edge of an inner panel 16 of the automobile door 12, thereby decorating and sealing the same.

The door inner weather strip 10 is attached to the inner panel 16 of the automobile door 12 to seal the interior side surface of the door glass 14.

As shown in FIG. 2, conventionally, the door inner weather strip 10 includes a trim section 18 for attachment to a flange part 20 provided along an upper edge of the inner panel 16 of the automobile door 12, and a seal section 22 of which a tip contacts the interior side surface of the door glass 14. The seal section 22 includes a first seal lip 24 on an upper side thereof and a second seal lip 26 on a lower side thereof.

An outer weather strip 28 is also attached to an upper edge of an outer panel 30 on an exterior side of the automobile door 12 to seal an exterior side surface of the door glass 14.

Figure 3:
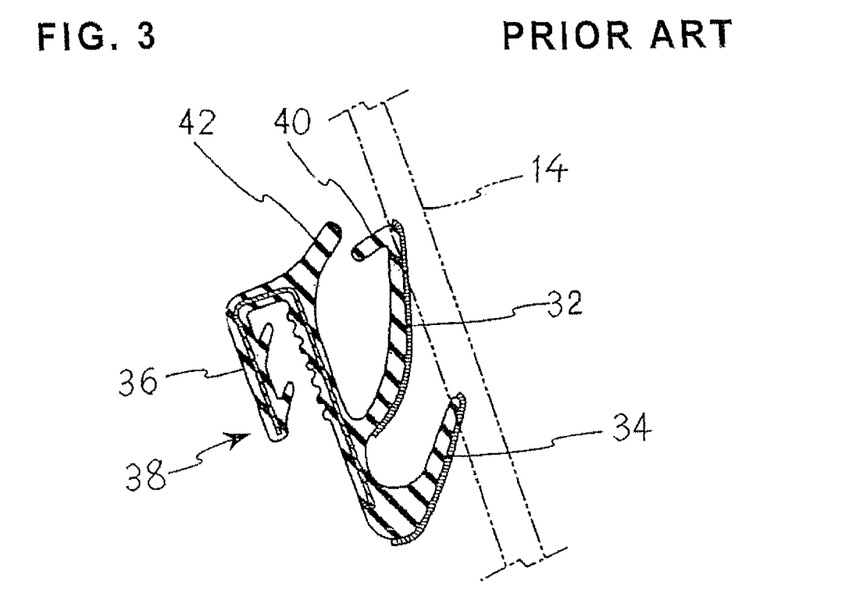
FIG. 3 is a cross-sectional view of another conventional door inner weather strip.

In another conventional case shown in FIG. 3, a first seal lip 32 and a second seal lip 34 are provided in a door inner weather strip 38 so as to extend upwardly from a trim section 36 thereof into a lip-like configuration (See Japanese translation of PCT International Application Publication No. JP-T-2010-521349, for example). And in order to improve the sealing properties, a bending part 40 is provided in a tip of the first seal lip 32 such that upon contacting the door glass 14, the bending part 40 contacts a sub lip 42 to define a closed space with the first seal lip 32 and the sub lip 42.

Figure 4:
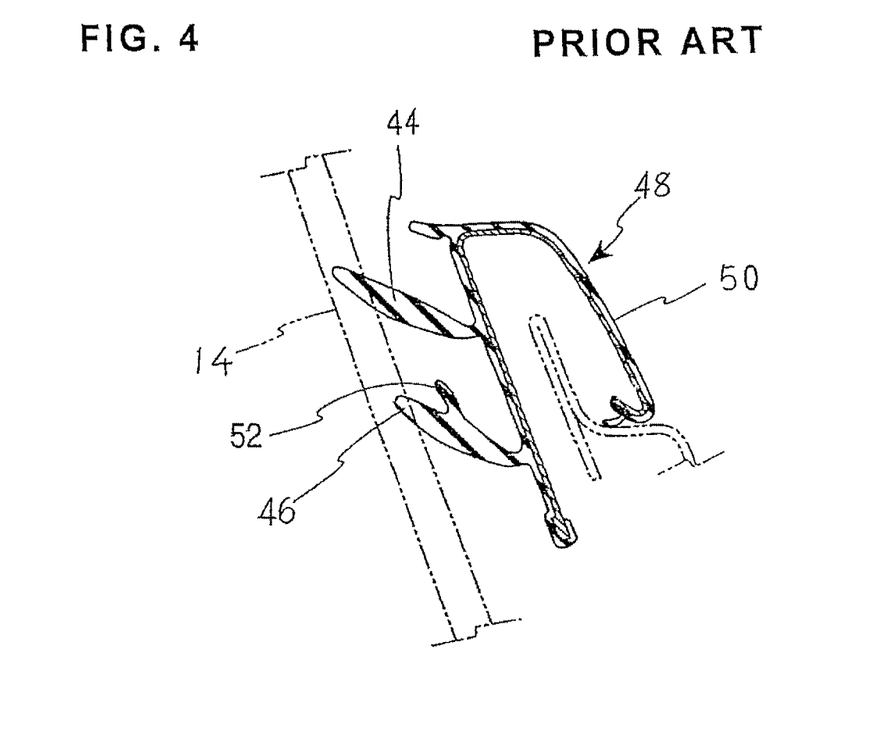
FIG. 4 is a cross-sectional view of still another conventional door inner weather strip.

In addition, in still another conventional case shown in FIG. 4, a first seal lip 44 and a second seal lip 46 are provided in a door outer weather strip 48 so as to extend upwardly from a trim section 50 thereof into a lip-like configuration (See Japanese Unexamined Patent Application Publication No. 2012-171559, for example). And in order to improve the sealing properties, a sub lip 52 is provided in a reverse surface of the second seal lip 46 such that upon contacting the door glass 14, the sub lip 52 contacts the trim section 50 to increase a pressing force of the second seal lip 46 against the door glass 14 with a reaction force of the sub lip 52.

The above-described conventional cases exhibit such a problem that when the door glass 14 is raised and lowered, the seal lips may be reversed with the door glass 14.

Figure 5:
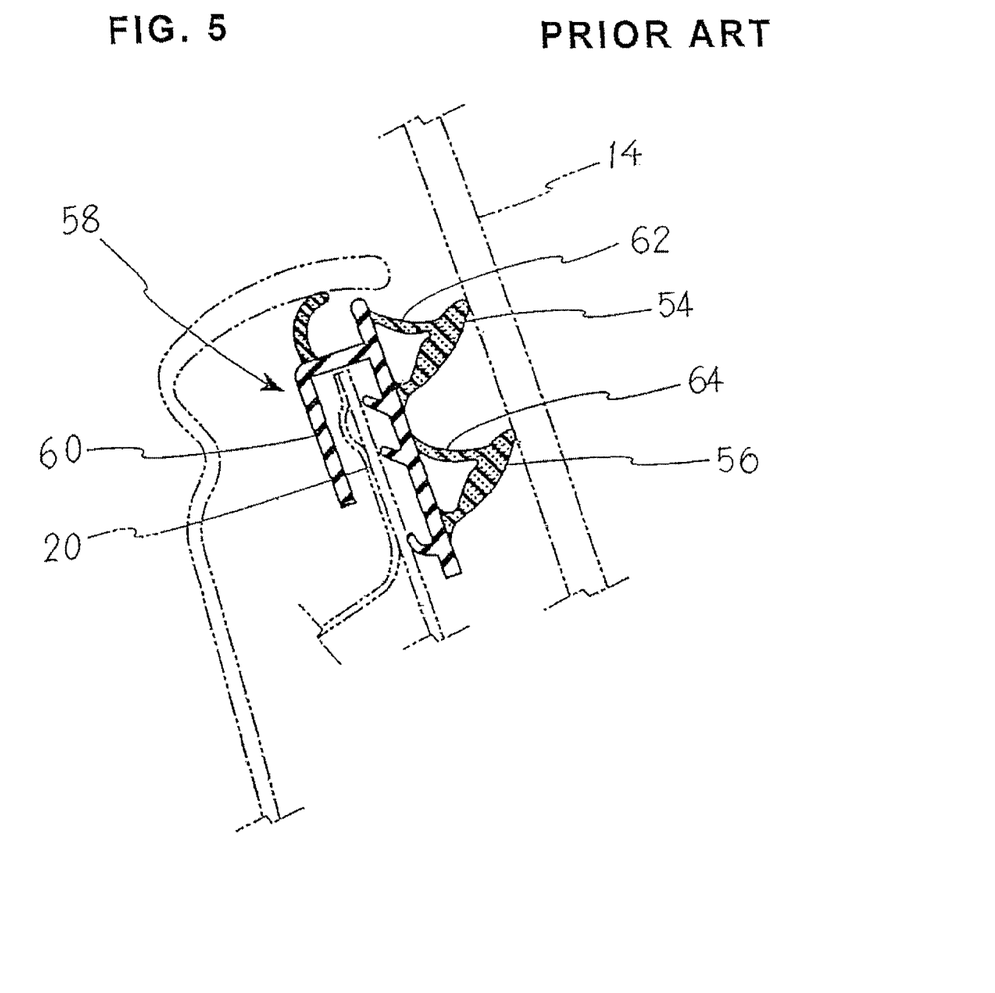
FIG. 5 is a cross-sectional view of a further conventional door inner weather strip.

In order to solve this problem, as shown in FIG. 5, a first seal lip 54 and a second seal lip 56 are provided in a door inner weather strip 58 so as to extend from a trim section 60, and support parts 62 and 64 are respectively provided in the first seal lip 54 and the second seal lip 56 to prevent the reversing thereof. (See Japanese Unexamined Patent Application Publication No. 2013-107608, for example).

But, since the first seal lip 54 and the second seal lip 56 are supported with the support parts 62 and 64, the deflection loads of the first seal lip 54 and the second seal lip 56 increase to cause the increment of the raising/lowering load of the door glass 14. As a result, noises may occur around the door glass 14. In addition, the first seal lip 54 and the support part 62 define a tubular part, and the second seal lip 56 and the support part 64 define another tubular part so that favorable extrusion moldability has not been obtained.

SUMMARY OF THE INVENTION

It is an object of the present invention to provide a weather strip capable of preventing the reversing of seal lips caused by the raising and lowering of a door glass, and restraining the increment of the raising/lowering load of the door glass to enable smooth raising and lowering of the door glass.

In order to achieve the above-described object, according to a first aspect of the present invention, in a door inner weather strip for an automobile door provided with a door glass that is raised and lowered, the door inner weather strip is attached to the automobile door around a belt line thereof, and includes a trim section provided on an interior side of the automobile door for covering a flange around the belt line thereof, and a seal section extending from the trim section to an exterior side of the automobile door, and having tips for contacting and sealing an interior side surface of the door glass, the seal section includes a first seal section and a second seal section, the first seal section and the second seal section are respectively provided with a first attaching leg and a second attaching leg extending from the trim section along with a first seal lip and a second seal lip for contacting the door glass, the first seal lip and the second seal lip are formed such that tips thereof face each other, the first seal lip curves convexly on the side of the door glass, and the tip of the second seal lip is overlapped with the tip of the first seal lip so as to press the tip of the first seal lip when the first seal lip and the second seal lip contact the door glass.

With the arrangement of the first aspect of the present invention, in a door inner weather strip for an automobile door provided with a door glass that is raised and lowered, the door inner weather strip is attached to the automobile door around a belt line thereof, and includes a trim section provided on an interior side of the automobile door for covering a flange around the belt line thereof, and a seal section extending from the trim section to an exterior side of the automobile door, and having tips for contacting and sealing an interior side surface of the door glass. Therefore, the seal section ensures the sealing between the interior side surface of the door glass and the automobile door, whereas the trim section covers the flange around the belt line to improve the appearance therearound.

Since the seal section includes a first seal section and a second seal section, the interior side surface of the door glass can be doubly sealed, whereby the sealing properties can be improved.

The first seal section and the second seal section are respectively provided with a first attaching leg and a second attaching leg, each extending from the trim section, along with a first seal lip and a second seal lip for contacting the door glass. With this arrangement, the first seal lip and the second seal lip are respectively retained with the first attaching leg and the second attaching leg, whereby the first seal lip and the second seal lip can securely contact the door glass.

The first seal lip and the second seal lip are formed such that tips thereof face each other, the first seal lip curves convexly on the side of the door glass, and the tip of the second seal lip is overlapped with the tip of the first seal lip to press the tip of the first seal lip when the first seal lip and the second seal lip contact the door glass.

With this arrangement, by pressing the tip of the first seal lip with the tip of the second seal lip, the second seal lip can prevent the reversing of the first seal lip when the door glass is raised and lowered. Furthermore, since the first seal lip and the second seal lip are respectively formed into a lip-like configuration, the deflection load decreases when they contact the door glass, whereby the raising/lowering load of the door glass decreases to make the raising and lowering thereof smooth and prevent occurrence of noises.

According to a second aspect of the present invention, a neighborhood of a joint between the first attaching leg and the first seal lip inclines in an identical direction to that of the second seal lip.

With the arrangement of the second aspect of the present invention, since the neighborhood of the joint between the first attaching leg and the first seal lip inclines in an identical direction to that of the second seal lip, the first seal lip readily deforms in the inclination direction when the first seal lip contacts the door glass, whereby the deflection load thereof decreases to reduce the raising/lowering load of the door glass, thereby ensuring smooth raising and lowering thereof.

According to a third aspect of the present invention, the second attaching leg or the trim section has an engaging part adapted to be engaged with the tip of the first seal lip when the first seal lip contacts the door glass.

With the arrangement of the third aspect of the present invention, an engaging part adapted to be engaged with the tip of the first seal lip when the first seal lip contacts the door glass is formed in the second attaching leg or the trim section. Therefore, when the first seal lip contacts the door glass, the engaging part stops the sliding of the first seal lip to prevent abnormal deformations of the first seal lip, whereby a curving surface of the first seal lip can securely contact a side surface of the door glass.

According to a fourth aspect of the present invention, a sub-seal lip is formed in the second seal lip such that when the second seal lip contacts the door glass, a tip of the sub-seal lip presses the tip of the first seal lip.

With the arrangement of the fourth aspect of the present invention, the sub-seal lip is formed in the second seal lip, and when the second seal lip contacts the door glass, the tip of the sub-seal lip presses the tip of the first seal lip. Therefore, when the tip of the second seal lip contacts the side surface of the door glass, a reaction force is generated so that the sub-seal lip securely presses the tip of the first seal lip to prevent the reversing of the first seal lip.

According to a fifth aspect of the present invention, the first attaching leg includes a first attaching leg base part extending from the trim section and a first attaching leg inclination part obliquely extending from the first attaching leg base part and connected to the first seal lip.

With the arrangement of the fifth aspect of the present invention, the first attaching leg includes a first attaching leg base part extending from the trim section and a first attaching leg inclination part obliquely extending from the first attaching leg base part and connected to the first seal lip. Therefore, even where the width of the first seal lip is great, the first attaching leg inclination part is extended from the first attaching leg base part, thereby retaining side edges of the first seal lip with the first attaching leg inclination part. Since the first attaching leg base part and the first attaching leg inclination part are formed while bending, resultant bending parts can flex according to the pressing force received with the first seal lip, whereby the sealing properties and the sliding properties can be ensured.

According to a sixth aspect of the present invention, a first attaching leg base bending part having a thickness less than those of remaining parts is formed in a joint between the first attaching leg base part and the first attaching leg inclination part.

With the arrangement of the sixth aspect of the present invention, a first attaching leg base bending part having a thickness less than those of remaining parts is formed in a joint between the first attaching leg base part and the first attaching leg inclination part. Therefore, the first attaching leg readily flexes in the first attaching leg base bending part, and can flex according to the pressing force received with the first seal lip, whereby the sealing properties and the sliding properties can be effected.

According to a seventh aspect of the present invention, a first attaching leg inclination bending part having a thickness less than those of remaining parts is formed in a joint between the first attaching leg inclination part and the first seal lip.

With the arrangement of the seventh aspect of the present invention, the first attaching leg inclination bending part having a thickness less than those of remaining parts is formed in the joint between the first attaching leg inclination part and the first seal lip. Therefore, the first attaching leg readily flexes in the first attaching leg inclination bending part, and can flex according to the pressing force received with the first seal lip, whereby the sealing properties and the sliding properties can be ensured.

According to an eighth aspect of the present invention, the second attaching leg includes a second attaching leg base part extending from the trim section and a second attaching leg retention part extending from the second attaching leg base part while bending in a generally perpendicular direction thereto, and connected to the second seal lip.

With the arrangement of the eighth aspect of the present invention, the second attaching leg includes a second attaching leg base part extending from the trim section and a second attaching leg retention part extending from the second attaching leg base part while bending in a generally perpendicular direction thereto, and connected to the second seal lip. Therefore, even where the width of the second seal lip is great, by virtue of the second attaching leg base part, the second attaching leg retention part can be extended to side edges of the second seal lip, the tip of the second seal lip can be overlapped with the tip of the first seal lip, and the side edges of the second seal lip can be retained with the second attaching leg retention part. Since the second attaching leg base part and the second attaching leg retention part are formed while bending, a resultant bending part can flex according to the pressing force received with the second seal lip, whereby the sealing properties and the sliding properties can be ensured.

The first seal lip and the second seal lip are formed such that tips thereof face each other, the first seal lip is formed to curve convexly on the side of the door glass, and the tip of the first seal lip is formed so as to be overlapped and pressed with the tip of the second seal lip when the first seal lip and the second seal lip contact the door glass. With this arrangement, by pressing the tip of the first seal lip with the tip of the second seal lip, the reversing of the first seal lip and the second seal lip can be prevented when the door glass is raised and lowered.

Other objects, features, and characteristics of the present invention will become apparent upon the consideration of the following description and the appended claims with reference to the accompanying drawings, all of which form a part of this specification.

DETAILED DESCRIPTION OF THE PREFERRED EMBODIMENTS

Embodiments of the present invention will be explained with reference to FIG. 1, FIG. 6 and FIG. 7.

FIG. 1 is a side view of an automobile. As shown in FIG. 1, a door inner weather strip 66 and a door outer weather strip (not shown) are attached to a front door 12 around a belt line thereof to seal interior and exterior side surfaces of the door glass 14 and enable the raising and lowering of the door glass 14 within the front door 12.

The present invention relates to the door inner weather strip 66 adapted to seal the interior side surface of the door glass 14.

First, a first embodiment of a door inner weather strip in accordance with the present invention will be explained with reference to FIG. 6, and next a second embodiment of a door inner weather strip in accordance with the present invention will be explained.

Figure 6:
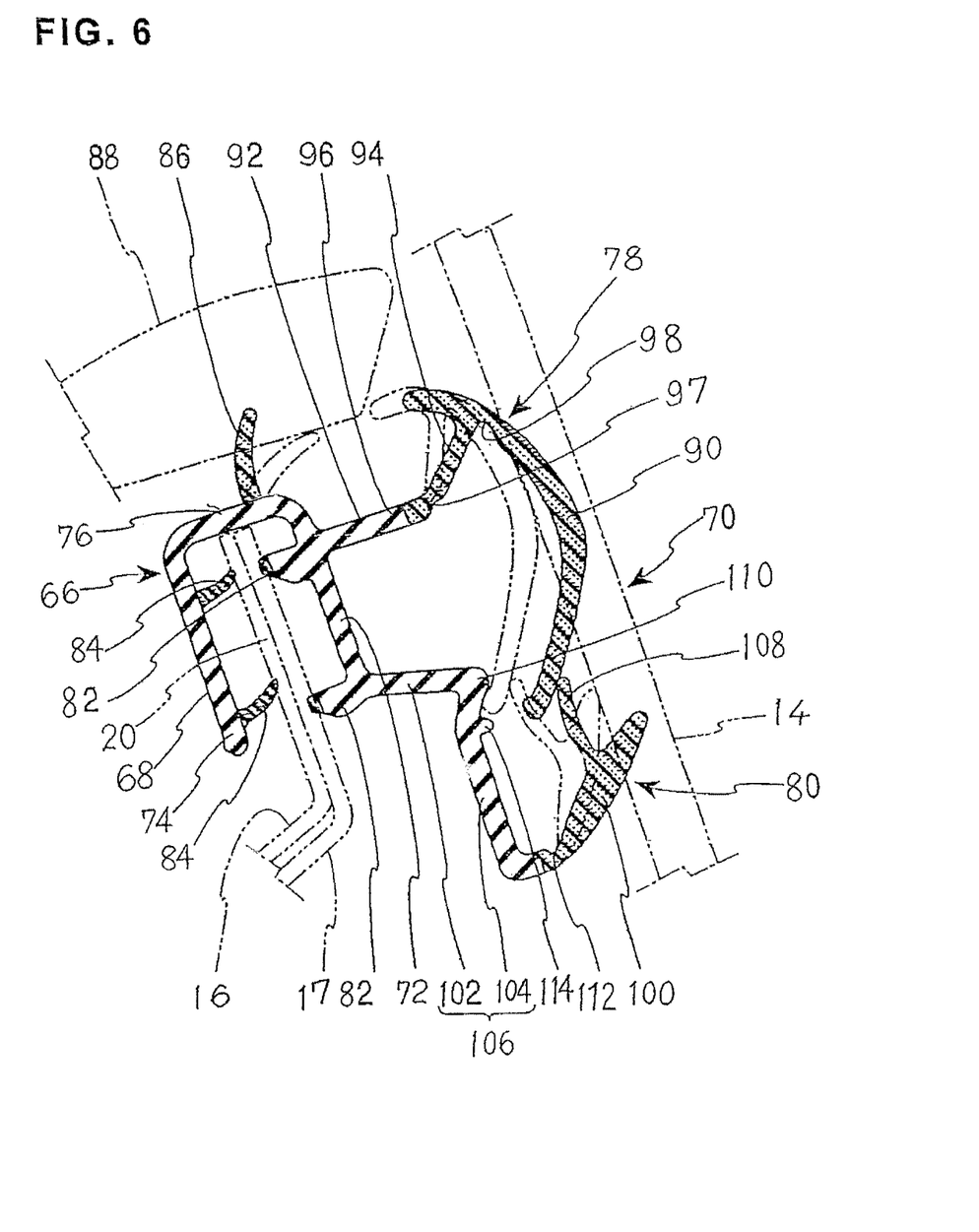
FIG. 6 is a cross-sectional view of a first embodiment of a door inner weather strip in accordance with the present invention.

As shown in FIG. 6, the door inner weather strip 66 includes a trim section 68 having a generally inverted U-shaped cross-section and a seal section 70 for sealing an interior side surface of the door glass 14. The trim section 68 includes an exterior side wall 72, an interior side wall 74 and an upper wall 76, and the seal section 70 includes a first seal section 78 and a second seal section 80.

The exterior side wall 72 has two exterior retention lips 82 in an inner surface thereof on an upper side and a lower side thereof, and the interior side wall 68 has two interior retention lips 84 in an inner surface thereof on an upper side and a lower side thereof, similarly to the exterior side wall 72. The exterior retention lips 82 and the interior retention lips 84 hold a flange 20 obtained by joining tips of an inner panel 16 and a reinforce panel 17 to each other, thereby retaining the door inner weather strip 66 on the flange 20.

The exterior side wall 72, the interior side wall 74 and the upper wall 76 can be formed of a solid synthetic resin. In addition, where an insert is embedded therewithin, a solid material of a synthetic rubber such as EPDM, etc. and a thermoplastic elastomer can be used. Therefore, the door inner weather strip 66 can be securely mounted on the flange 20.

An upper wall seal lip 86 can be formed to extend from the upper wall 76 in the direction of a door trim 88. The upper wall seal lip 86 can provide a seal between the trim section 68 and the door trim 88. The upper wall seal lip 86 can be formed of a foamed material or a soft material of a synthetic rubber such as EPDM, etc. and a thermoplastic elastomer.

The seal section 70 projects from the trim section 68 outwardly, and contacts the door glass 14 to seal the interior side surface of the door glass 14. With this arrangement, the sealing between the interior side surface of the door glass 14 and the vehicle door 12 is ensured, and the trim section 68 covers the flange 20 around the belt line to improve the appearance thereof.

As described above, the seal section 70 includes the first seal section 78 and the second seal section 80. The interior side surface of the door glass 14 can be doubly sealed with the first seal section 78 and the second seal section 80, whereby the sealing properties can be improved.

The first seal section 78 includes a first seal lip 90 adapted to contact and seal the door glass 14, a first attaching leg base part 92 integrally extending from the exterior side wall 72 of the trim section 68 in an approximately perpendicular direction thereto, and a first attaching leg inclination part 94 obliquely extending from the first attaching leg base part 92, and connected to the first seal lip 90. The first attaching leg base part 92 and the first attaching leg inclination part 94 define a first attaching leg 96. The first attaching leg base part 92 can be formed of a solid material, similarly to the trim section 68. The first attaching leg inclination part 94 can be formed of a foamed material or a soft material, similarly to the first seal lip 90.

The first seal lip 90 is formed to curve in a convex arc-shaped configuration on the exterior side of the vehicle body. A curving central part of the first seal lip 90 contacts the interior side surface of the door glass 14 to seal the same.

The first seal lip 90 is formed to curve into a lip-like and arc-shaped configuration, and one tip of the first seal lip 90 is connected to the obliquely extending first attaching leg inclination part 94. Therefore, when the first seal lip 90 contacts the door glass 14, the first seal lip 90 readily deforms because it is in a cantilevered condition, and readily inclines because it is connected to the first attaching leg inclination part 9, whereby it readily slides to decrease the deflection load, the raising/lowering load of the door glass 14 is reduced to ensure smooth raising and lowering of the door glass 14, and the occurrence of noises can be prevented.

A first attaching leg base bending part 97 having a thickness less than those of remaining parts is formed in a joint between the first attaching leg base part 92 and the first attaching leg inclination part 94. With this arrangement, the first attaching leg 96 readily flexes in the first attaching leg base bending part 97 so that when the first seal lip 90 contacts the door glass 14, the first attaching leg base bending part 97 can flex according to the pressing force received with the first seal lip 90, whereby the sealing properties and the sliding properties can be ensured.

In addition, a first attaching leg inclination bending part 98 having a thickness less than those of remaining parts is formed in a joint between the first attaching leg inclination part 94 and the first seal lip 90. Since the first attaching leg inclination part 94 is provided, a tip of the first seal lip 90 having a great width can be retained with the first attaching leg inclination part 94, whereby the first seal lip 90 can be brought into contact with the door glass 14. The first attaching leg inclination bending part 98 can flex according to the pressing force received with the first seal lip 90, similarly to the first attaching leg base bending part 97, whereby the sealing properties and the sliding properties can be ensured.

The second seal section 80 includes a second seal lip 100 adapted to contact and seal the door glass 14, a second attaching leg base part 102 extending from the exterior side wall 72 of the trim section 68 in an approximately perpendicular direction thereto, and a second attaching leg retention part 104 extending from the second attaching leg base part 102 while bending in an approximately perpendicular direction thereto, and connected to the second seal lip 100. The second attaching leg base part 102 and the second attaching leg retention part 104 define a second attaching leg 106. The second attaching leg base part 102 and the second attaching leg retention part 104 can be formed of a solid material.

The second seal lip 100 is formed into a curving configuration, and contacts the door glass 14 to seal the same. The second seal lip 100 can be formed of a foamed material or a soft material.

As shown in FIG. 6, the first seal lip 90 and the second seal lip 100 are formed so as to face each other. In addition, they are formed such that when the first seal lip 90 and the second seal lip 100 contact the door glass 14, tips of the first seal lip 90 and the second seal lip 100 are overlapped with each other so as to press the tip of the first seal lip 90 with the tip of the second seal lip 100.

With this arrangement, by pressing the tip of the first seal lip 90 with the tip of the second seal lip 100, the reversing of the first seal lip 90 and the second seal lip 100 can be prevented when the door glass 14 is raised and lowered to pull the first seal lip 90 and the second seal lip 100. In particular, the reversing of the first seal lip 90 having a great width can be prevented. In addition, the second seal lip 100 is formed into a lip-like configuration, similarly to the first seal lip 90 so that when the second seal lip 100 contacts the door glass 14, the deflection load of the second seal lip 100 decreases to reduce the raising/lowering load of the door glass 14, thereby ensuring smooth raising and lowering of the door glass 14, and preventing the occurrence of noises.

In the first embodiment, a sub-seal lip 108 is provided in the second seal lip 100. When the second seal lip 100 contacts the door glass 14, the tip of the second seal lip 100 contacts the interior side surface of the door glass 14 to generate a reaction force. Consequently, the sub-seal lip 108 securely presses the tip of the first seal lip 90, whereby the reversing of the first seal lip 90 can be prevented.

A bending part between the second attaching leg base part 102 and the second attaching leg retention part 104, which bends in an approximately perpendicular direction thereto, defines an attaching bending part 110, and a joint between the second attaching leg retention part 104 and the second seal lip 100 defines a retention bending part 112 having a thickness less than those of remaining parts. With this arrangement, a tip of the second seal lip 100 can be retained with the second attaching leg retention part 104 so that the second seal lip 100 can be brought into contact with the door glass 14. The retention bending part 112 can flex according to the pressing force received with the second seal lip 100 so that the sealing properties and the sliding properties can be ensured.

In addition, in the first embodiment, it is preferable that the second attaching leg retention part 104 is provided with a projection-shaped attaching leg engaging part 114 for engaging with the tip of the first seal lip 90 when the first seal lip 90 contacts the door glass 14. In this case, when the first seal lip 90 contacts the door glass 14, the sliding of the tip of the first seal lip 90 is stopped to prevent abnormal deformations of the first seal lip 90, whereby a curving surface of the first seal lip 90 can be securely brought into contact with the interior side surface of the door glass 14.

Next, a second embodiment of a door inner weather strip in accordance with the present invention will be explained with reference to FIG. 7.

Figure 7:
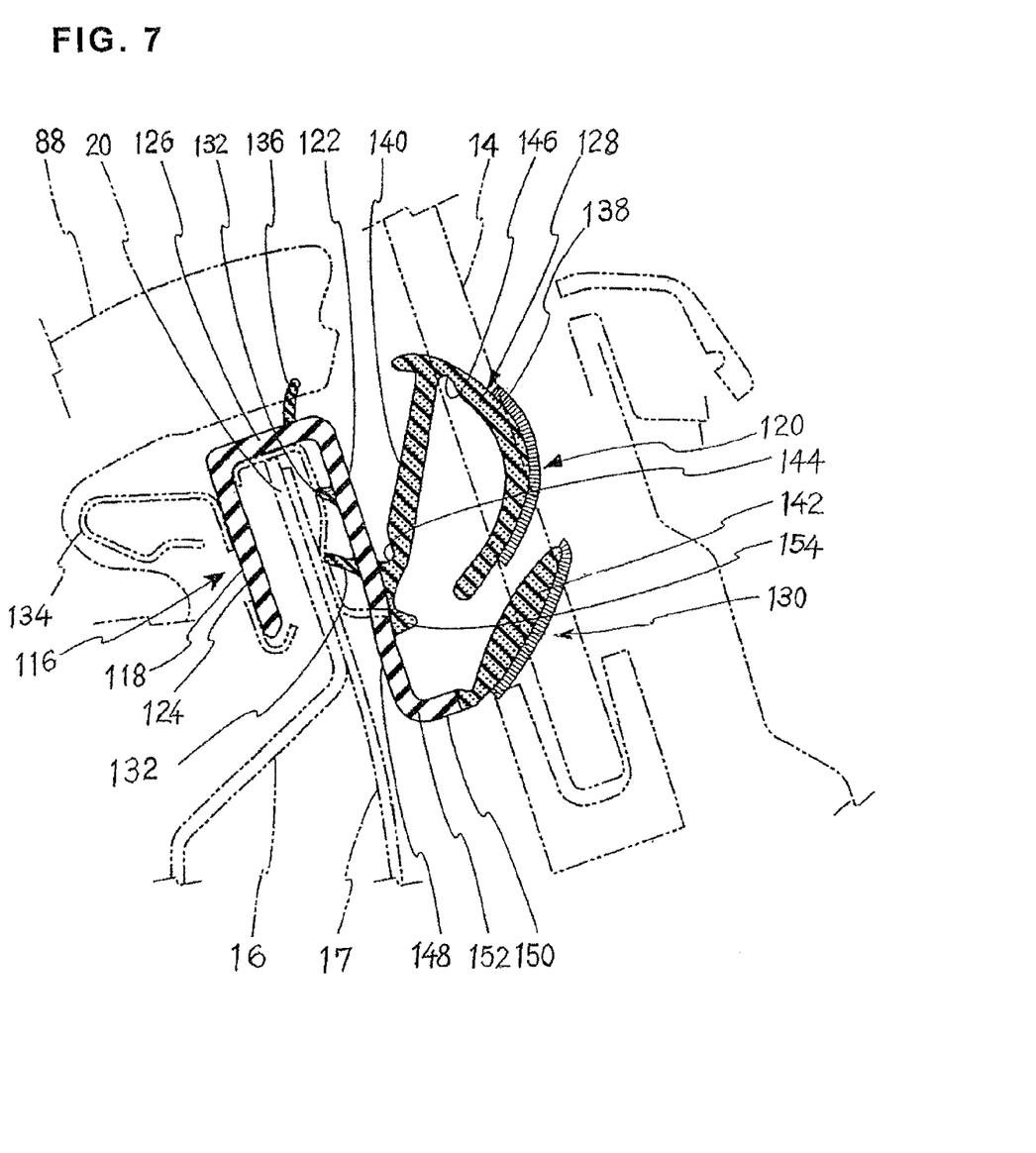
FIG. 7 is a cross-sectional view of a second embodiment of a door inner weather strip in accordance with the present invention.

As shown in FIG. 7, a door inner weather strip 116 of the second embodiment includes a trim section 118 and a seal section 120, similarly to the door inner weather strip 66 of the first embodiment. The trim section 118 includes an exterior side wall 122, an interior side wall 124 and an upper wall 126, and the seal section 120 includes a first seal section 128 and a second seal section 130.

The exterior side wall 122 has two exterior retention lips 132 in an inner surface thereof on an upper side and a lower side thereof, and a clip 134 is engaged with the interior side wall 124 and an inner space of the trim section 118 to hold the flange 20 provided by joining tips of the inner panel 16 and the reinforce panel 17, thereby retaining the door inner weather strip 116.

An upper wall seal lip 136 can be formed in the upper wall 126 to extend in the direction of the door trim 88. The upper wall seal lip 136 can provide a seal between the trim section 118 and the door trim 88. The upper wall seal lip 136 can be formed of a foamed material or a soft material, similarly to the first embodiment.

The seal section 120 projects from the trim section 118 outwardly, and a tip thereof contacts the door glass 14 to seal an interior side surface of the door glass 14. With this arrangement, the sealing between the interior side surface of the door glass 14 and the automobile door 12 can be ensured, and the trim section 118 covers the flange 20 around the belt line to improve the appearance thereof.

The seal section 120 includes the first seal section 128 and the second seal section 130. The interior side surface of the door glass 14 can be doubly sealed with the first seal section 128 and the second seal section 130, whereby the sealing properties can be improved.

The first seal section 128 includes a first seal lip 138 adapted to contact and seal the door glass 14, a first attaching leg 140 extending obliquely from the exterior side wall 122 of the trim section 118. The first seal lip 138 is formed to curve in a convex arc-shaped configuration on the side of the door glass 14. A central part of the curving first seal lip 138 contacts the interior side surface of the door glass 14 to seal the same. With this arrangement, side edges of the first seal lip 138 having a great width can be retained with the first attaching leg 140, whereby the first seal lip 138 can be brought into contact with the door glass 14. The first seal lip 138 extends from a tip of the first attaching leg 140 towards a later-described second seal lip 142 so as to face each other.

The first seal lip 138 is formed to curve into a lip-like and arc-shaped configuration so that when the first seal lip 138 contacts the door glass 14, the deflection load of the first seal lip 138 decreases to reduce the raising/lowering load of the door glass 14, thereby ensuring smooth raising and lowering of the door glass 14, and preventing occurrence of noises. A low friction sliding member such as a flocking, a urethane coat, a silicone coat, etc. can be provided on a surface of the first seal lip 138 and the second seal lip 142.

A first attaching leg base bending part 144 having a thickness less than those of remaining parts is formed in a joint between the first attaching leg 140 and the exterior side wall 122 of the trim section 116. With this arrangement, the first attaching leg 140 readily flexes in the first attaching leg base bending part 144 so that when the first seal lip 138 contacts the door glass 14, the first attaching leg base bending part 144 can flex according to a pressing force received with the first seal lip 138, whereby the sealing properties and the sliding properties can be ensured.

In addition, a first attaching leg inclination bending part 146 having a thickness less than those of remaining parts is formed in a joint between the first attaching leg 140 and the first seal lip 138. The first attaching leg inclination bending part 146 can flex according to a pressing force received with the first seal lip 138, similarly to the first attaching leg base bending part 144, whereby the sealing properties and the sliding properties can be ensured.

The second seal section 130 includes the second seal lip 142 adapted to contact and seal the door glass 14, a second attaching leg base part 148 extending from the exterior side wall 122 of the trim section 116 in an extension direction thereof, and a second attaching leg retention part 150 extending from the second attaching leg base part 148 while bending in an approximately perpendicular direction thereto, and connected to the second seal lip 142. The second attaching leg base part 148 and the second attaching leg retention part 150 define a second attaching leg 152.

The second seal lip 142 is formed to curve, and contacts the door glass 14 to seal the same.

As shown in FIG. 7, the first seal lip 138 and the second seal lip 142 are formed so as to face each other. In addition, they are formed such that when the first seal lip 138 and the second seal lip 142 contact the door glass 14, tips of the first seal lip 138 and the second seal lip 142 are overlapped with each other so as to press the tip of the first seal lip 138 with the tip of the second seal lip 142.

With this arrangement, by pressing the tip of the first seal lip 138 with the tip of the second seal lip 142, the reversing of the first seal lip 138 and the second seal lip 142 can be prevented when the door glass 14 is raised and lowered to pull the first seal lip 138 and the second seal lip 142 with the interior side surface of the door glass 14. In addition, the second seal lip 142 is formed into a lip-like configuration, similarly to the first seal lip 138 so that when the second seal lip 142 contacts the door glass 14, the deflection load of the second seal lip 142 decreases to reduce the raising/lowering load of the door glass 14, thereby ensuring smooth raising and lowering of the door glass 14, and preventing occurrence of noises.

In addition, in the second embodiment, it is preferable that a projection-shaped second attaching leg engaging part 154 for engaging with the tip of the first seal lip 138 when the first seal lip 138 contacts the door glass 14 is formed in the second attaching leg base part 148. Where the first attaching leg 140 is attached to around a center of the exterior side wall 122, the second attaching leg engaging part 154 can be formed in the exterior side wall 122. In this case, when the first seal lip 138 contacts the door glass 14, the sliding of the tip of the first seal lip 138 is stopped to prevent abnormal deformations of the first seal lip 138, whereby a curving surface of the first seal lip 138 can be securely brought into contact with the interior side surface of the door glass 14.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A door inner weather strip for an automobile door provided with a door glass that is raised and lowered, the door inner weather strip being attached to the automobile door surrounding a belt line thereof, and comprising a trim section provided on an interior side of the automobile door for covering a flange surrounding the belt line thereof, and a seal section extending from the trim section to an exterior side of the automobile door, and having first and second tips for contacting and sealing an interior side surface of the door glass, the seal section including a first seal section and a second seal section, the first seal section being provided with a first attaching leg extended from the trim section along with a first seal lip for contacting the door glass, the second seal section being provided with a second attaching leg extended from the trim section along with a second seal lip for contacting the door glass, the first seal lip and the second seal lip being formed such that the first and second tips face each other, the first seal lip curves convexly on the interior side surface of the door glass, the tip of the second seal lip is overlapped with the tip of the first seal lip so as to press the tip of the first seal lip when the first seal lip and the second seal lip contact the door glass, and the first seal lip extends from an end of the first attaching leg toward the second tip such that a side of the first tip facing toward the interior surface of the door glass faces a side of the second tip facing away from the interior surface of the door glass.

2. The door inner weather strip as claimed in claim 1, wherein a portion of a joint between the first attaching leg and the first seal lip inclines in an identical direction to a direction that the second seal lip inclines.

3. The door inner weather strip as claimed in claim 1, wherein one of the second attaching leg and the trim section has an engaging part adapted to be engaged with the tip of the first seal lip when the first seal lip contacts the door glass.

4. The door inner weather strip as claimed in claim 1, wherein a sub-seal lip is formed in the second seal lip such that when the second seal lip contacts the door glass, a tip of the sub-seal lip presses the tip of the first seal lip.

5. The door inner weather strip as claimed in claim 1, wherein the first attaching leg includes a first attaching leg base part extending from the trim section and a first attaching leg inclination part obliquely extending from the first attaching leg base part and connected to the first seal lip.

6. The door inner weather strip as claimed in claim 5, wherein a first attaching leg base bending part having a first thickness less than a second thickness of remaining parts of the first seal section is formed in a joint between the first attaching leg base part and the first attaching leg inclination part.

7. The door inner weather strip as claimed in claim 5, wherein a first attaching leg inclination bending part having a thickness less than a thickness of remaining parts of the first seal section is formed in a joint between the first attaching leg inclination part and the first seal lip.

8. The door inner weather strip as claimed in claim 1, wherein the second attaching leg includes a second attaching leg base part extending from the trim section, and a second attaching leg retention part extending from the second attaching leg base part while bending in a substantially perpendicular direction thereto, and connected to the second seal lip.

9. The door inner weather strip as claimed in claim 1, wherein the first and second seal lips are both configured to directly contact the door glass.

10. A door inner weather strip for an automobile door provided with a door glass that is raised and lowered, the door inner weather strip being attached to the automobile door surrounding a belt line thereof, and comprising a trim section provided on an interior side of the automobile door configured to cover a flange surrounding the belt line thereof, and a seal section extending from the trim section to an exterior side of the automobile door, the seal section including a first seal section having a first attaching leg extended from the trim section along with a first seal lip configured to directly contact the door glass, the first seal lip having a first tip, and a second seal section having a second attaching leg extended from the trim section along with a second seal lip configured to directly contact the door glass, the second seal lip having a second tip, wherein the first and second tips are configured to contact and seal an interior side surface of the door glass, the first seal lip and the second seal lip are formed such that the first and second tips face each other, the first seal lip curves convexly on the side of the door glass, and the second tip overlaps the first tip so as to press the first tip when the first seal lip and the second seal lip contact the door glass.

11. The door inner weather strip as claimed in claim 10, wherein a portion of a joint between the first attaching leg and the first seal lip inclines in an identical direction to a direction that the second seal lip inclines.

12. The door inner weather strip as claimed in claim 10, wherein one of the second attaching leg and the trim section has an engaging part adapted to be engaged with the tip of the first seal lip when the first seal lip contacts the door glass.

13. The door inner weather strip as claimed in claim 10, wherein a sub-seal lip is formed in the second seal lip such that when the second seal lip contacts the door glass, a tip of the sub-seal lip presses the tip of the first seal lip.

14. The door inner weather strip as claimed in claim 10, wherein the first attaching leg includes a first attaching leg base part extending from the trim section and a first attaching leg inclination part obliquely extending from the first attaching leg base part and connected to the first seal lip.

15. The door inner weather strip as claimed in claim 14, wherein a first attaching leg base bending part having a thickness less than a thickness of remaining parts of the first seal section is formed in a joint between the first attaching leg base part and the first attaching leg inclination part.

16. The door inner weather strip as claimed in claim 14, wherein a first attaching leg inclination bending part having a thickness less than a thickness of remaining parts of the first seal section is formed in a joint between the first attaching leg inclination part and the first seal lip.

17. The door inner weather strip as claimed in claim 10, wherein the second attaching leg includes a second attaching leg base part extending from the trim section, and a second attaching leg retention part extending from the second attaching leg base part while bending in a substantially perpendicular direction thereto, and connected to the second seal lip.

18. The door inner weather strip as claimed in claim 10, wherein the first seal lip extends from an end of the first attaching leg toward the second tip such that a side of the first tip facing toward the interior surface of the door glass faces a side of the second tip facing away from the interior surface of the door glass.

* * * * *